US008588822B1

(12) United States Patent
Bhattacharya et al.

(10) Patent No.: US 8,588,822 B1
(45) Date of Patent: Nov. 19, 2013

(54) ASYNCHRONOUS TRIGGERING OF MOBILE STATION LOCATION ESTIMATION

(71) Applicant: Polaris Wireless, Inc., Mountain View, CA (US)

(72) Inventors: Tarun Kumar Bhattacharya, San Jose, CA (US); Mahesh B. Patel, Saratoga, CA (US)

(73) Assignee: Polaris Wireless, Inc., Mountainview, CA (US)

( * ) Notice: Subject to any disclaimer, the term of this patent is extended or adjusted under 35 U.S.C. 154(b) by 0 days.

(21) Appl. No.: 13/739,911

(22) Filed: Jan. 11, 2013

(51) Int. Cl.
*H04W 24/00* (2009.01)

(52) U.S. Cl.
USPC .................................. 455/456.5; 455/456.1

(58) Field of Classification Search
USPC .............................................. 455/456.1–457
See application file for complete search history.

(56) References Cited

U.S. PATENT DOCUMENTS

| 6,097,958 A * | 8/2000 | Bergen ...................... 455/456.2 |
| 7,783,299 B2 | 8/2010 | Anderson et al. |
| 2010/0330996 A1 * | 12/2010 | Svedevall et al. ............. 455/436 |

\* cited by examiner

*Primary Examiner* — George Eng
*Assistant Examiner* — Nam Huynh
(74) *Attorney, Agent, or Firm* — Kaplan Breyer Schwarz & Ottesen, LLP

(57) ABSTRACT

A system and method are disclosed for triggering location estimation of mobile stations in a geographic region of interest. The disclosed system includes a list of International Mobile Subscriber Identities ("IMSI") used to track which mobile stations are to have location estimates generated, a database of Network Measurement Reports ("NMR") used for generating the location estimates, and a location engine. The system operates as a group of concurrently executing processes that i) process IMSIs and NMRs that are extracted by and received from probes that monitor communication links; ii) generate location estimates of mobile stations in the region of interest, based on a sequential indexing of the IMSI list; iii) maintain the freshness of the NMR database; and iv) maintain the freshness of the IMSI list. These processes operate such that the triggering of the location estimations occurs asynchronously with respect to the detection of information on the communication links.

1 Claim, 12 Drawing Sheets

300

ASYNCHRONOUS TRIGGERING OF MOBILE STATION LOCATION ESTIMATION

FIELD OF THE INVENTION

The present invention relates to telecommunications in general, and, more particularly, to a technique for estimating the location of mobile stations in a particular geographic region.

BACKGROUND OF THE INVENTION

FIG. 1 depicts a diagram of the salient components of wireless telecommunications system 100 in the prior art. Wireless telecommunications system 100 comprises: mobile station 101, base transceiver stations 102-1, 102-2, and 102-3 (collectively or generically referenced as "102"), base station controller 103, and mobile switching center 111. Wireless telecommunications system 100 provides wireless telecommunications service to all of geographic region 120, in accordance with the Global System for Mobile Communications (GSM) set of standards and in well-known fashion.

Base transceiver station (BTS) 102 is mobile station 101's access point to system 100. The BTS performs speech encoding, encryption, and other functions. Communications between mobile station 101 and a BTS 102 occur over an air interface. These communications, which include control information as well as voice/data, are carried over traffic channels via known methods.

One or more control channels are used to establish and maintain communications between BTS 102 and mobile station 101. The control channel also carries reports of measurements recently made by mobile station 101. The network measurement report, or "NMR," for any given mobile station 101 includes measurements of the received signal strength of the control channels associated with each BTS that is currently in range of that mobile station. This measurement is commonly referred to as a received signal strength indication ("RSSI"). The NMR includes the identity of the mobile station making the measurements, a set of RSSI measurements and, for each RSSI measurement, the identity of the BTS with which it is associated. System 100 can include a different number of BTSs than that depicted.

Base station controller (BSC) 103 controls multiple BTSs. For example, the BSC handles radio channel allocation, frequency administration, receives power and signal measurements originating from the mobile stations, and controls handovers between BTSs coupled to the same BSC. As depicted in FIG. 1, BSC 103 controls BTS 102-1 through 102-3. Although BSC 103 is depicted as being geographically remote from the BTSs 102, it can be co-located with any of the BTSs or with the mobile switching center 111. System 100 can include multiple BSCs.

The interface between BSC 103 and each BTS 102 is known as the "Abis" link or interface. The communications carried over the Abis link include both voice/data information and control information. These communications are carried over a traffic channel and a signaling channel. The Abis link carries the NMRs originating from mobile station 101 communicating with each BTS 102-1 through 102-3 controlled by BSC 103.

Mobile switching center (MSC) 111 provides at least some of the switching capability across system 100. MSC 111 comprises a switch that orchestrates the provisioning and control of telecommunications service to the mobile stations. System 100 can include a plurality of MSCs, each responsible for a large geographic portion of the network. MSC 111 can be connected to multiple BSCs, and it can interface with other MSCs. The interface between the mobile switching center and each base station controller is called the "A" link or interface.

MSC 111 also enables a subscriber of system 100 to place a call to, or receive a call from another network, such as the Public Switched Telephone Network (PSTN) or other wireless networks.

It is known that information contained in an NMR, or otherwise reported to BTS 102 by mobile station 101, can be used, via any of various techniques, to determine or estimate the location of the reporting mobile station. Such information can include, for example, information that directly indicates the geographic location of a wireless mobile station, such as latitude/longitude data, or other processed Global Positioning System (GPS) data, or a street address. Such information can also include indirectly related data, such as raw GPS coordinates or RSSI data. A convenient place to obtain such data in system 100 is at the Abis links between BSC 103 and BTSs 102, such as via the use of taps or probes.

Since the late 1990s, there have been proposals to tap data from the Abis links. The tapped information is typically used to provide location information about a specific mobile station. One such proposal is presented in U.S. Pat. No. 7,783,299, which is referred to hereinafter as the "'299 patent."

The '299 patent presents a method and system whereby certain signaling links, such as the Abis link, are monitored for a predefined "trigger." If the trigger is detected, then a predefined location service is initiated, such as a location service that determines the location of the mobile station that is associated with the triggering event. For example, the trigger can be the identifier for a particular mobile station, a 9-1-1 call, etc.

FIG. 2 depicts an embodiment of system 200 disclosed in the '299 patent, while FIG. 3 depicts method 300 by which system 200 operates. The system is based on GSM network architecture and comprises mobile station 101, BTS 102-1, 102-2, and 102-3, BSC 103, and MSC 111. Probes 204-1, 204-2, and 204-3 are electrically coupled to the Abis links between BSC 103 and BTS 102-1, 102-2, and 102-3, respectively. Probes 204-1 through 204-3 are capable of monitoring the Abis links for certain triggers.

In accordance with process 301 of method 300, triggers are defined. As an illustration of the method, it is assumed that there are two triggers: (1) a 9-1-1 call and (2) the predetermined identifier of a mobile station of interest.

In accordance with process 302, probes 204-1 through 204-3 commence monitoring the Abis links.

In accordance with process 303, a determination is made as to whether a predefined trigger is detected on one of the Abis links. If not, the probes continue to monitor for a predefined trigger. On the other hand, if a predefined trigger is detected, then control proceeds to process 304.

As a first example, when mobile station 101 originates a 9-1-1 call via BTS 102-1, probe 204-1 detects that call as a triggering event (i.e., detects that the dialed digits field contains "9-1-1"). Relevant information concerning mobile station 101 is directed to location application 215 so that the location of that mobile station is determined in accordance with process 304. The location of mobile station 101 is then reported to an interested party (e.g., the police, etc.).

As a second example, when mobile station 101 having the predetermined identifier originates a call via BTS 102-2, probe 204-2 identifies this call as a triggering event, and relevant information is directed to location application 215.

The location of mobile station 101 is determined per operation 304 and then reported to an interested party (e.g., homeland security, etc.).

In contrast to the foregoing examples, when mobile station 101 places a call, but neither is originating a 9-1-1 call nor has the predetermined identifier, then no triggering event is detected at operation 303. Consequently, location determination based on the predefined triggers is not initiated in this case.

SUMMARY OF THE INVENTION

The present invention provides a system and method for triggering location estimation of mobile stations in a geographic region, such that the triggering occurs asynchronously with respect to the detection of information on one or more communication links.

In accordance with the illustrative embodiment of the present invention, the system and method is implemented in a GSM wireless telecommunications network. Because the present invention pertains to locating mobile stations and because the mobile stations are, by definition, mobile, the system must have some way to continually update its location-dependent data. To that end, the inventive system further includes probes that monitor communication links in the GSM network, such as the Abis links. The Abis links carry network transactions, such as communications to and from mobile stations. The Abis probes detect data pertaining to those network transactions. The location-dependent data that are monitored-for include, without limitation, i) the International Mobile Subscriber Identity ("IMSI") for each communicating mobile station and ii) the network measurement reports ("NMR") sent from each such mobile station.

The inventive system includes a list of IMSIs, a database of NMRs, and a location engine. The IMSI list is a list of the IMSIs for all mobile stations in a particular geographic region of interest, such as the region served by a given Mobile Switching Center. The NMR database contains the NMRs, or relevant portions thereof, from all mobile stations in the region of interest. The location engine determines the location of a mobile station based on the information contained in its associated NMR.

The IMSI list is initially populated from subscriber information stored in the wireless telecommunications network's Home Location Register ("HLR"). The HLR does not account for the movement of mobile stations that are away from their home location (i.e., mobiles that are roaming outside of their home network). As a consequence, the IMSI list is continually updated via real-time, probe-detected data, in order to account for the movement of mobile stations into and out of the region of interest, as described below.

In accordance with the illustrative embodiment, the system operates as a group of concurrently executing processes that provide the requisite functionality. Although the processes share information such as the IMSI list and the NMR database, they operate at least partially asynchronously with respect to one another. The concurrent processes are as follows:

(i) Processing of IMSI and NMR data that are extracted from the monitored communication links;
(ii) Processing of location estimates of mobile stations, based on a sequential indexing of the IMSI list;
(iii) Maintaining of the freshness of the NMR database; and
(iv) Maintaining of the freshness of the IMSI list.

In accordance with process (i), the disclosed system processes IMSIs and NMRs that are extracted by and received from the monitoring probes. Additions to the IMSI list result from new IMSIs that are obtained by this process. Each IMSI extracted by an Abis probe is compared to the IMSIs residing in the IMSI list. If the extracted IMSI does not appear in the IMSI list, the system adds the IMSI to the list. This would occur, for example, for "visiting" or "roaming" mobile stations in the region of interest. In regard to NMRs that are extracted by the Abis probes, an extracted NMR is added to the NMR database such that it can be referenced later according to the corresponding IMSI.

In accordance with process (ii), the system processes location estimates of mobile stations in the region of interest, based on a sequential indexing of the IMSI list. The IMSI list is maintained in computer-readable memory as a circular-queue data structure and is indexed by a location-estimation pointer. As each IMSI in the list is indexed by the pointer, a trigger for the location of the corresponding mobile station is issued to the location engine. The location engine accesses the NMR database and, if present, obtains the NMR data (e.g., RSSI, timing advance, etc.) that are required to generate a location estimate. The location engine determines the mobile station's location and provides it to an interested party.

In accordance with process (iii), the system maintains the freshness of the NMR database. The NMRs in the NMR database must be regularly updated to obtain accurate location estimates for each mobile station. Based on a sequential indexing of the NMRs in the database by an NMR maintenance pointer, each NMR is checked for "freshness" by examining a timestamp that is representative of the NMR. If the timestamp indicates that the NMR is older than a predetermined amount of time, the system deletes the NMR from the database and obtains an updated NMR by processing a mobile-terminated location request (MTLR), as is known in the art. The system also processes an MTLR when an NMR has not yet been made available for an IMSI, as part of process (ii).

In accordance with process (iv), the system also maintains the freshness of the IMSI list. The IMSIs in the IMSI list must be regularly updated to obtain location estimates for those mobile stations that are in the region of interest. Based on a sequential indexing of the IMSIs in the database by an IMSI maintenance pointer, each IMSI is checked for "freshness" by examining a timestamp that is representative of the IMSI. If the timestamp indicates that no message has originated from a mobile station—as represented by its IMSI—for more than a predetermined amount of time, the system deletes the IMSI from the list. An outdated IMSI might be attributed to any of a number of reasons indicating that the mobile station is no longer available in the geographic region of interest. Such reasons include, without limitation, the mobile station being turned off, the mobile being in a region with low signal strength, the mobile being absent from the region of interest, and so on.

As already discussed, the four processes of the illustrative embodiment that are described above operate at least partially concurrently and at least partially asynchronously with respect to one another. As part of the asynchronous operation, the pointers that are used to trigger location estimates, maintain freshness of the NMR database, and maintain freshness of the IMSI list, are separate from and operate independently of one another.

In the aforementioned fashion, information obtained by the four concurrently executing processes is used to estimate the location of each mobile station in the geographic region of interest. Of particular note is the manner in which embodiments of the present invention trigger the generating of an estimate of each mobile station's location; specifically, it is a pointer to the IMSI list that serves as the trigger. That is, a location-estimation pointer sequentially indexes each IMSI in the list, and as each IMSI is indexed, a request for location estimation is issued. This is in contrast to the prior art, such as embodied by the '299 patent described above, in which the trigger is a detected network transaction (e.g., placing a specific type of call, placing a call to or from a specific mobile station, involving a specific set of dialed digits, etc.) that is monitored-for over a communication link, such as the Abis link.

For pedagogical purposes, consider the circular queue data structure in which the IMSI list is maintained as a photographic, carousel slide projector. In such a projector, a circular tray holds a group of 35 mm slides. The tray has a metal plate on the bottom with an opening about 5 cm wide that allows a single slide to pass to a projection gate below it. In the projection gate, the slide is positioned between a light source and a lens, such that an image is projected onto a screen. The projector body contains a motor that rotates the tray containing the slides. As the tray is advanced, a reciprocating mechanism pushes the currently loaded slide back out into the tray, then the tray is rotated, and the next slide falls through the opening into the projection gate.

The circular tray is analogous to the circular queue of the illustrative embodiment and the opening is closely analogous to the location-estimation pointer. A slight difference is that in the case of the carousel projector, the tray moves while the opening remains stationary, whereas in the case of the data structure, the pointer is advanced to successive memory locations while the circular queue remains "stationary." Continuing with the analogy, assume that the images on the 35 mm slides depict various locations within a town.

In the context of the projector, the "trigger" for a location request; that is, the trigger for projecting the location captured on the slide is the opening, which enables a slide to move into the projection gate. In other words, it is only when a slide is present in the projection gate after falling through the opening that the information on the slide can be projected onto the screen. In analogous fashion, the "trigger" for the generating of the location estimate is the pointer indexing a particular IMSI in the IMSI list.

In the same way that adding a slide to the carousel is not a trigger for projecting that slide, neither is the addition of any particular IMSI (as a consequence of a network event) to the IMSI list. It does not matter whether the IMSIs in the IMSI list are sourced from the HLR (historical subscriber information) or are obtained from the Abis link (real-time network event). There is no location estimate generated for an IMSI unless and until the pointer indexes that particular IMSI. Stated differently, there is no temporal relationship between any network event and the location request. As previously explained, the various processes that are responsible for updating the IMSI list operate asynchronously with respect to the process responsible for issuing location requests.

Although a GSM-based wireless network is featured in the illustrative embodiment of the present invention, it will be clear to those skilled in the art, after reading this specification, how to make and use alternative embodiments of the present invention in which a different type of wireless network is featured. Furthermore, although IMSIs are featured in the illustrative embodiment of the present invention, it will be clear to those skilled in the art, after reading this specification, how to make and use alternative embodiments of the present invention in which a different type of mobile station identifier or subscriber identifier is featured.

An illustrative embodiment of the present invention for locating one or more mobile stations in a geographic region of interest served by a wireless telecommunications network comprises: storing, by a data-processing system, a list of International Mobile Subscriber Identities (IMSI) that are present in the list according to a predetermined ordering, wherein the IMSIs in the list identify mobile stations for which location estimates are to be generated; monitoring, by the data-processing system, a nonempty set of predetermined communication links in the wireless telecommunications network, wherein the set of communication links comprise at least an Abis link, and wherein the communication links are monitored for i) messages that comprise IMSIs and ii) Network Measurement Report (NMR) messages; generating, by the data-processing system, location estimates for the mobile stations that are identified by the IMSIs in the list, wherein the generating of each location estimate is triggered based on sequentially indexing each IMSI in the list, and wherein the location estimates are based the NMR messages; and deleting, by the data-processing system, a first IMSI from the list when it is determined that the mobile station identified by the first IMSI is no longer available in the geographic region of interest.

DETAILED DESCRIPTION

For the purposes of this specification, the following terms and their inflected forms are defined as follows:

The term "location" is defined as a zero-dimensional point, a finite one-dimensional path segment, a finite two-dimensional surface area, or a finite three-dimensional volume.

The term "trigger" is defined as the direct cause for an action.

The term "mobile station" is defined as a wireless telecommunications terminal that is capable of transmitting and/or receiving communications wirelessly. As is well known to those skilled in the art, a mobile station is also commonly referred to by a variety of alternative names such as a wireless transmit/receive unit (WTRU), a user equipment (UE), a wireless terminal, a fixed or mobile subscriber unit, a pager, a cellular telephone, a personal digital assistant (PDA), a computer, or any other type of device capable of operating in a wireless environment.

The terms used to describe elements of a wireless telecommunications network are given their industry-established meanings, unless otherwise indicated. These terms include: mobile switching center, base station controller, base transceiver station, gateway mobile switching center, network measurement report, received signal strength indication, Abis link, A-link, and International Mobile Subscriber Identity.

The following abbreviations are used in this specification:
GSM Global System Mobile
MSC Mobile Switching Center
BSC Base Station Controller
BTS Base Transceiver Station
MS Mobile Station
NMR Network Measurement Report
RSSI Received Signal Strength Indication
IMSI International Mobile Subscriber Identity
HLR Home Location Register
VLR Visitors Location Register
MTLR Mobile Terminal Location Request
SIM Subscriber Identity Module Overview—

Figure 1:
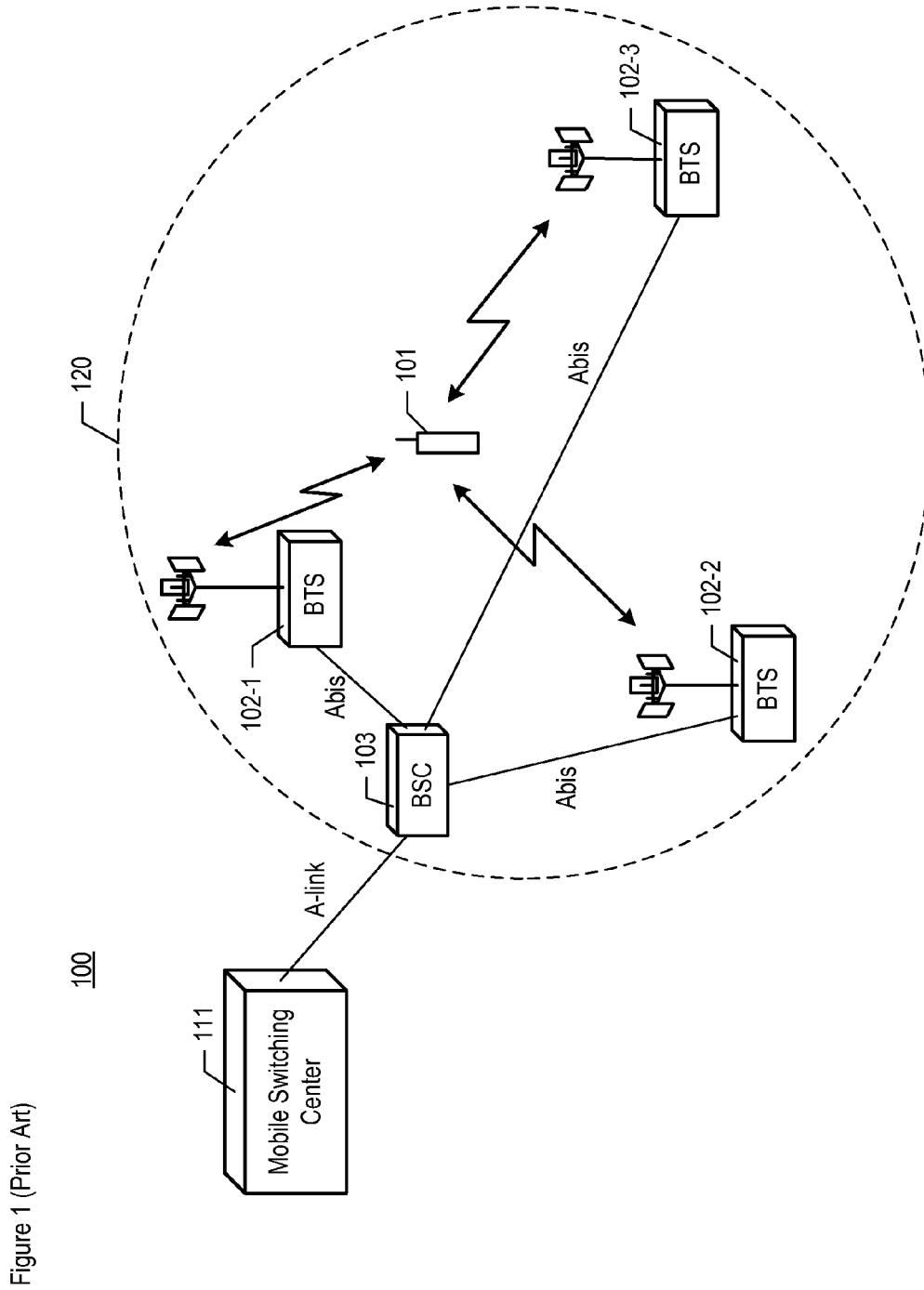
FIG. 1 depicts a diagram of the salient components of wireless telecommunications system 100 in the prior art.
Figure 2:
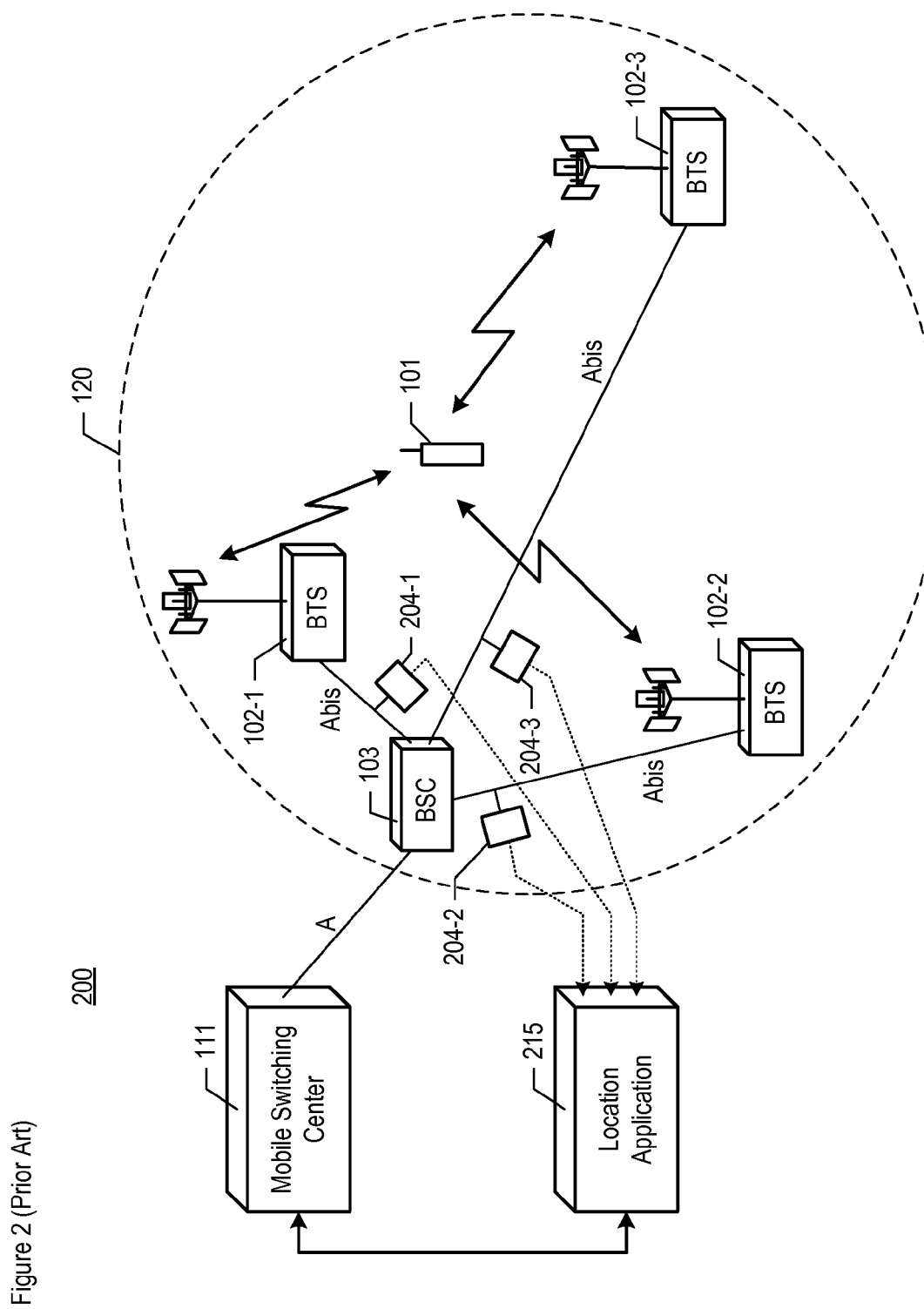
FIG. 2 depicts prior-art system 200 that incorporates triggers for location-based service applications in conjunction with wireless telecommunications system 100.
Figure 3:
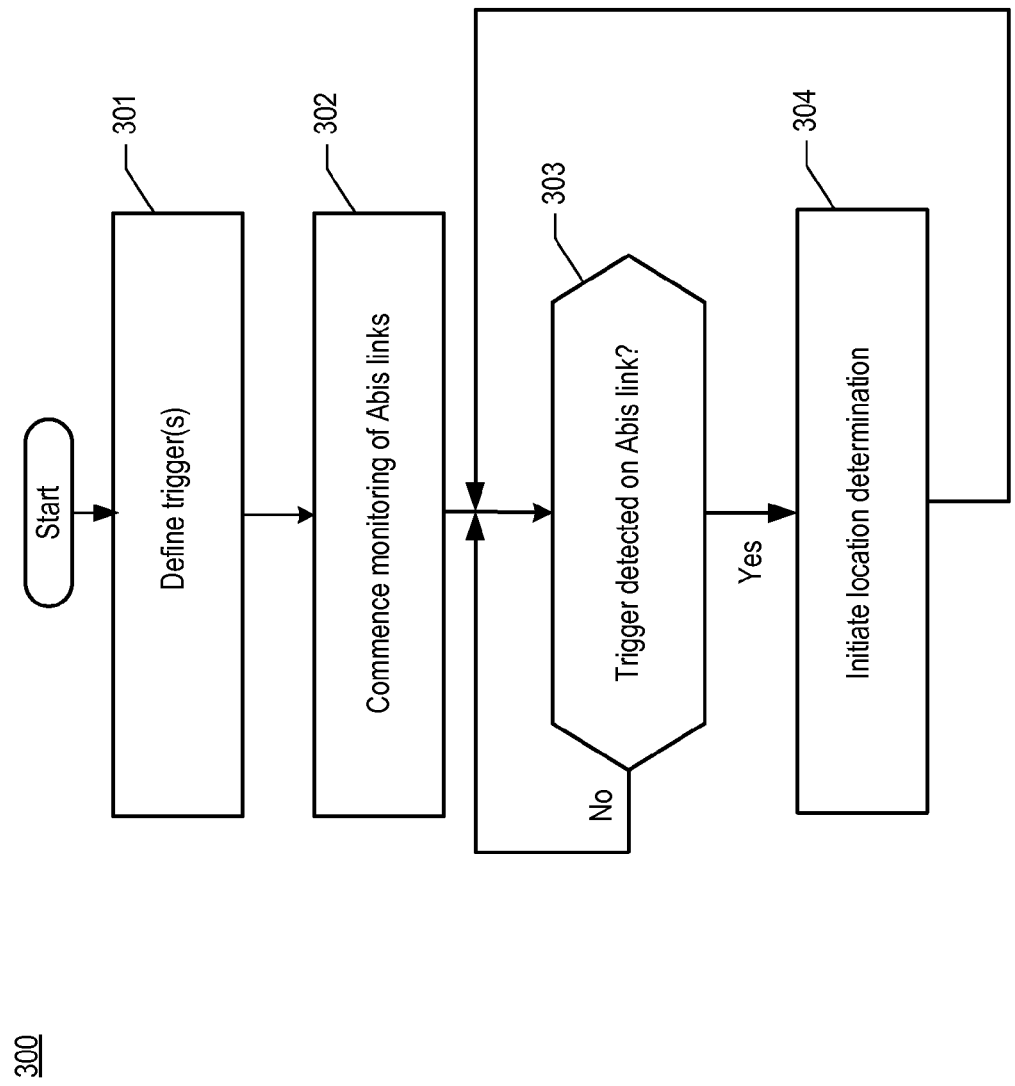
FIG. 3 depicts method 300 for operating the prior-art system of FIG. 3.
Figure 4:
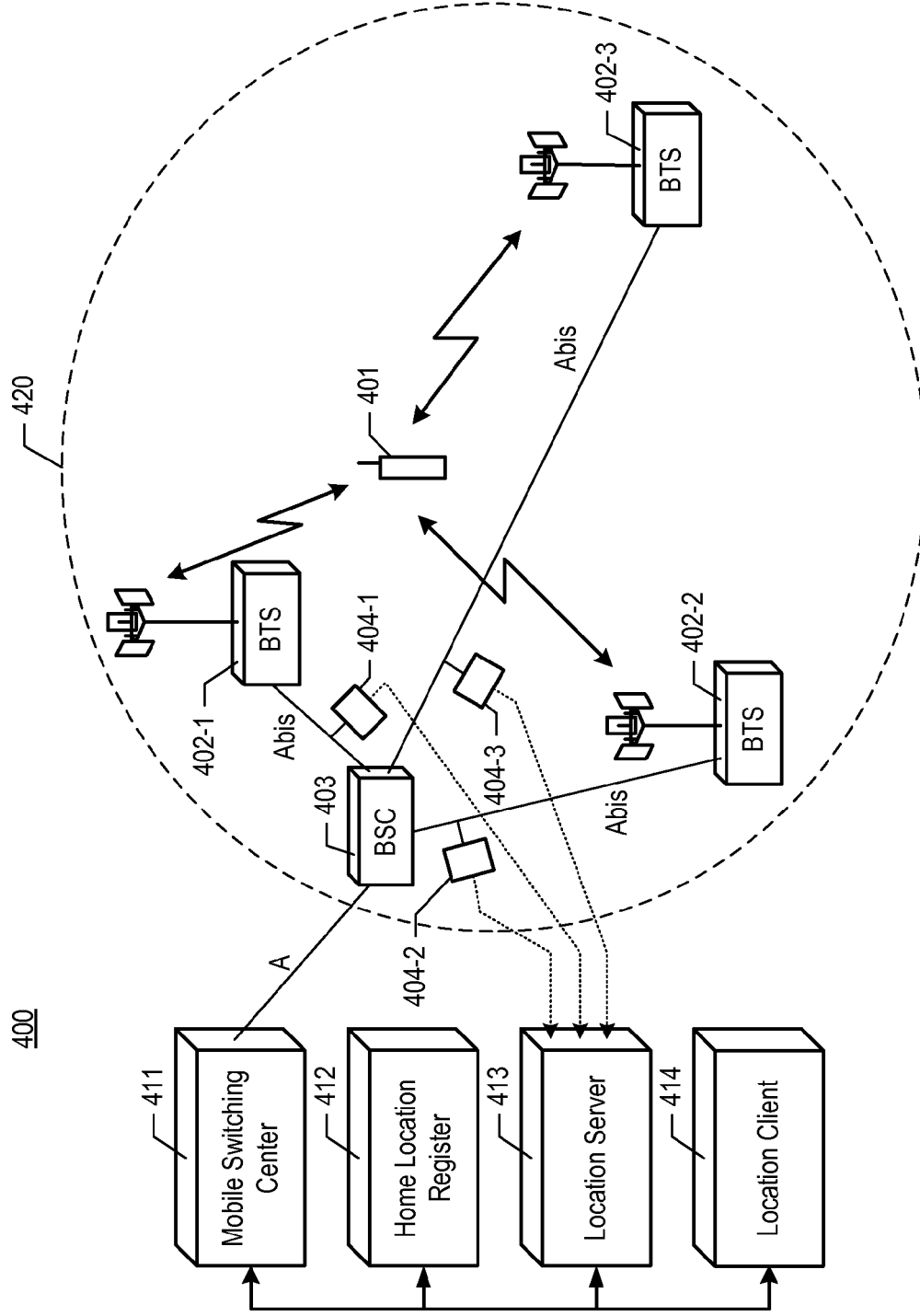
FIG. 4 depicts a diagram of the salient components of wireless telecommunications system 400 in accordance with the illustrative embodiment of the present invention.

FIG. 4 depicts a diagram of the salient components of wireless telecommunications system 400 in accordance with the illustrative embodiment of the present invention. Wireless telecommunications system 400 is a data-processing system that comprises: mobile station 401, base transceiver stations 402-1, 402-2, and 402-3 (collectively or generically referenced as "402"), base station controller 403, probes 404-1, 404-2, and 404-3 (collective or generically referenced as "404"), mobile switching center 411, home location register 412, location server 413, and location client 414, which are interrelated as shown. The illustrative embodiment provides wireless telecommunications service to all of geographic region 420, in well-known fashion; generates location estimates for mobile stations within geographic region 420, including mobile station 401; and uses those estimates in one or more location-based applications.

In accordance with the illustrative embodiment, wireless telecommunications service is provided to mobile station 401 in accordance with the Global System for Mobile Communications (GSM) set of standards. After reading this disclosure, however, it will be clear to those skilled in the art how to make and use alternative embodiments of the present invention that operate in accordance with one or more other air-interface standards (e.g., Universal Mobile Telecommunications System "UMTS", Long Term Evolution "LTE", CDMA-2000, IS-136 TDMA, IS-95 CDMA, 3G Wideband CDMA, IEEE 802.11 WiFi, 802.16 WiMax, Bluetooth, etc.) in one or more frequency bands.

The elements of a GSM network have been previously described in this specification and are well known to those skilled in the art. To the extent that they are described further in this specification, it is primarily for the purposes of establishing or describing their relationship with respect to elements that are germane to embodiments of the present invention.

Mobile station 401 comprises the hardware and software necessary to be GSM-compliant and to perform the processes described below and in the accompanying figures. For example and without limitation, mobile station 201 is capable of:

i. receiving a mobile-terminated location request (MTLR) and being responsive to said request.

ii. measuring one or more location-dependent traits (e.g., signal strength, etc.) of one of more electromagnetic signals and of reporting the measurements to location server 413 (e.g., in the form of NMRs, etc.), and ii. transmitting one or more signals and of reporting the transmission parameters of the signals to location server 213

Mobile station 401 is mobile and can be at any location within geographic region 420. Although wireless telecommunications system 400 as depicted comprises only one mobile station, it will be clear to those skilled in the art, after reading this disclosure, how to make and use alternative embodiments of the present invention that comprise any number of mobile stations.

BTSs 402-1 through 402-3 communicate with mobile station 401 via radio and with BSC 403, all in well-known fashion. In accordance with the illustrative embodiment, each of BTSs 402-1 through 402-3 has one or more antennas that are associated with the base station, in order to enable communication with mobile station 401. As is well known to those skilled in the art, base transceiver stations are also commonly referred to by a variety of alternative names such as access points, nodes (e.g., Node-B, eNode-B, etc.), network interfaces, etc.

Although the illustrative embodiment comprises three base transceiver stations, it will be clear to those skilled in the art, after reading this disclosure, how to make and use alternative embodiments of the present invention that comprise any number of base transceiver stations.

In accordance with the illustrative embodiment of the present invention, the base transceiver stations are terrestrial, immobile, and within geographic region 420. It will be clear to those skilled in the art, after reading this disclosure, how to make and use alternative embodiments of the present invention in which some or all of the base transceiver stations are airborne, marine-based, or space-based, regardless of whether or not they are moving relative to the Earth's surface, and regardless of whether or not they are within geographic region 420.

BSC 403 communicates with BTSs 402-1 through 402-3 via Abis links, and with MSC 411 via an A-link, all in well-known fashion. Although the illustrative embodiment comprises a single base station controller, it will be clear to those skilled in the art, after reading this disclosure, how to make and use alternative embodiments of the present invention that comprise any number of base station controllers, wherein each base station controller can controller a different number of base transceiver stations than depicted.

Probes 404-1, 404-2, and 404-3 monitor the Abis links between BSC 403 and BTSs 402-1, 402-2, and 402-3, respectively. Probes 404-1 through 404-3 monitor for and detect data related to mobile stations, in well-known fashion. The accessed data includes, without limitation, the IMSI for each communicating mobile station as well as the NMR or NMRs transmitted by each such mobile station. In at least some embodiments of the present invention, probes 404-1 through 404-3 monitor for and detect data without impacting calls or other transactions that involve mobile station 401.

In some embodiments of the present invention, a probe can be used to monitor the A-link in addition to or instead of monitoring the Abis links. Moreover, probes can be used to monitor other links within system 400, as those who are skilled in the art will appreciate.

Although the illustrative embodiment comprises three probes, it will be clear to those skilled in the art, after reading this disclosure, how to make and use alternative embodiments of the present invention that comprise any number of probes.

MSC 411 comprises a switch that orchestrates the provisioning of telecommunications service to mobile station 401 and the flow of information to and from location server 413, as described below and in the accompanying figures. As is well known to those skilled in the art, mobile switching centers are also commonly referred to by other names such as mobility management entities (MME), wireless switching centers, mobile telephone switching offices (MTSO), routers, etc.

Although the illustrative embodiment comprises one mobile switching center, it will be clear to those skilled in the art, after reading this disclosure, how to make and use alternative embodiments of the present invention that comprise any number of mobile switching centers. For example, when a mobile station can interact with two or more mobile switching centers, the mobile switching centers can exchange and share information that is useful in estimating the location of the mobile station.

In accordance with the illustrative embodiment, all of the base transceiver stations and base station controller servicing mobile station 401 are associated with mobile switching center 411. It will be clear to those skilled in the art, after reading this disclosure, how to make and use alternative embodiments of the present invention in which any number of base transceiver stations and base station controllers are associated with any number of mobile switching centers.

HLR 412 is a central database that contains details of each mobile station subscriber that is authorized to use system 400 as the subscriber's home network. The details maintained by HLR 412 include the subscriber's IMSI. Although in some embodiments of the present invention there can be more than one HLR in system 400, each IMSI can be associated with only one logical HLR at a time. As described in detail below and in the accompanying figures, HLR 412 serves as the source of an initial list of IMSIs to be used by the technique of the illustrative embodiment in generating location estimates of the mobile stations.

Location server 413 comprises hardware and software that generate one or more estimates of the location of mobile station 401 as described below and in the accompanying figures. It will be clear to those skilled in the art, after reading this disclosure, how to make and use location server 413. Furthermore, although location server 413 is depicted in FIG. 4 as physically distinct from mobile switching center 411, it will be clear to those skilled in the art, after reading this disclosure, how to make and use alternative embodiments of the present invention in which location server 413 is wholly or partially integrated with mobile switching center 411.

In accordance with the illustrative embodiment, location server 413 communicates with mobile switching center 411, home location register 412, and location client 414 via a local area network; however it will be clear to those skilled in the art, after reading this disclosure, how to make and use alternative embodiments of the present invention in which location server 413 communicates with one or more of these entities via a different network such as, for example, the Internet, the Public Switched Telephone Network (PSTN), etc.

Location client 414 comprises hardware and software that use an estimate of the location of mobile station 401—provided by location server 413—in one or more location-based applications, as described below and in the accompanying figures.

In accordance with the illustrative embodiment, mobile switching center 411, home location register 412, location server 413, and location client 414 are outside of geographic region 420. It will be clear to those skilled in the art, after reading this disclosure, how to make and use alternative embodiments of the present invention in which some or all of mobile switching center 411, home location register 412, location server 413, and location client 414 are instead within geographic region 420.

Location Server 413—

Figure 5:
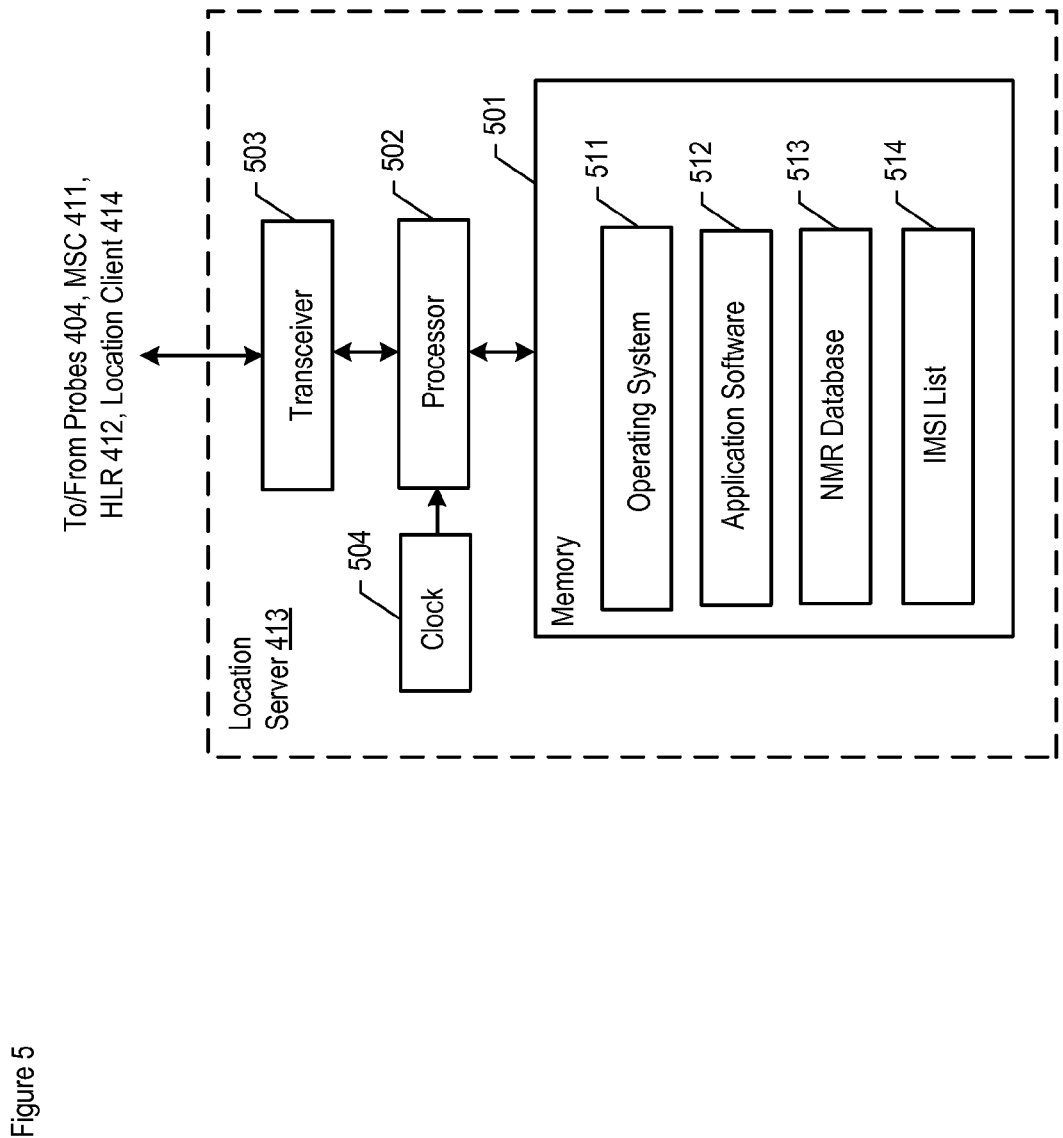
FIG. 5 depicts a block diagram of the salient components of location server 413 in system 400.

FIG. 5 depicts a block diagram of the salient components of location server 413 in accordance with the illustrative embodiment of the present invention. Location server 413 is a data-processing system that comprises: processor 501, memory 502, transceiver 503, and clock 504, which are interconnected as shown.

Processor 501 is a general-purpose processor that is capable of executing operating system 511 and application software 512, and populating, updating, using, and managing NMR Database 513 and IMSI List 514. It will be clear to those skilled in the art how to make and use processor 501.

Memory 502 is a non-volatile memory that stores:
  i. Operating system 511; and
  ii. Application software 512; and
  iii. NMR Database 513; and
  iv. IMSI List 514.

It will be clear to those skilled in the art how to make and use memory 502.

Application software 512 includes the location engine (hereinafter location engine "512") that generates a location estimate for a mobile station based on the information contained in the mobile station's associated NMR in NMR Database 513.

NMR database 513 includes NMRs, or relevant portions thereof (for location determination), provided by mobile stations within geographic region 420. The NMR sent by a mobile station includes measurements of the received signal strength of the control channels associated with each BTS that is currently in range of that mobile station. This measurement is commonly referred to as a received signal strength indication ("RSSI"). The transmitted NMR also includes the identity of the mobile station making the measurements, and, for each RSSI measurement, the identity of the BTS with which it is associated. The NMR also includes certain timing data. Henceforth, in this specification and the appended claims, reference to NMR(s) in the NMR database means information from the NMR sent from the mobile stations, which can be all of the information contained in the transmitted NMR or a part thereof. The data added to the NMR database from the NMR should contain sufficient information for a location engine to generate a location estimate.

To determine the freshness of any particular NMR in NMR database 513, a time stamp provides the time at which the NMR in the NMR database was received.

IMSI list 514 is a list of the IMSIs for at least some of the mobile stations in geographic region 420. The IMSI is a unique identification associated with all GSM, UMTS and LTE network mobile station users. It is stored as a 64-bit field in a SIM card, or equivalent, at the mobile station. The IMSI is usually presented as a 15-digit number, but can be shorter. The first three digits of the IMSI are the Mobile Country Code (MCC). The MCC digits are followed by the Mobile Network Code (MNC), which is either two digits (European standard) or three digits (North American standard). The remaining digits represent the Mobile Subscription Identification Number (MSIN) within the network's customer base.

To determine the freshness of any particular IMSI in IMSI List 514, a timestamp provides the time at which the IMSI in the list was most recently detected as arriving from a mobile station.

In some embodiments of the present invention, the IMSI is rarely transmitted over the air, in order to prevent eavesdroppers from identifying and tracking the subscriber on the radio interface. In those cases, a locally generated, temporary mobile subscriber identity (TMSI) is transmitted instead. Those who are skilled in the art, after reading this specification, will know how to implement embodiments of the invention that use "TMSIs" rather than "IMSIs." Furthermore, those who are skilled in the art, after reading this specification, will know how to implement embodiments of the invention that use a different type of mobile subscriber identity or mobile station identity than an IMSI and/or a TMSI.

In accordance with the illustrative embodiment, application software 512, NMR Database 513, and IMSI List 514 reside in memory accessible to a single (logical) server. That is, these components are co-located. It some alternative embodiments of the present invention, however, these components are not co-located and reside on disparate memories accessible to disparate servers. Such servers communicate with one another in well-known fashion.

Transceiver 503 enables location server 413 to transmit and receive information to and/or from one or more of the following: MSC 411, HLR 412, Location Client 414, probes 404-1 through 404-3, and other devices. In addition, transceiver 503 enables location server 413 to transmit information to and receive information from wireless terminal 401 and BTSs 402-1 through 402-3 via mobile switching center 411 and probes 404-1 through 404-3. It will be clear to those skilled in the art how to make and use transceiver 503.

Clock 504 enables location server 413 to assign the aforementioned timestamps, in well-known fashion, to the NMRs stored in NMR Database 513 and the IMSIs stored in IMSI List 513. It will be clear to those skilled in the art how to make and use clock 504.

Operation of the Illustrative Embodiment—

Figure 6:
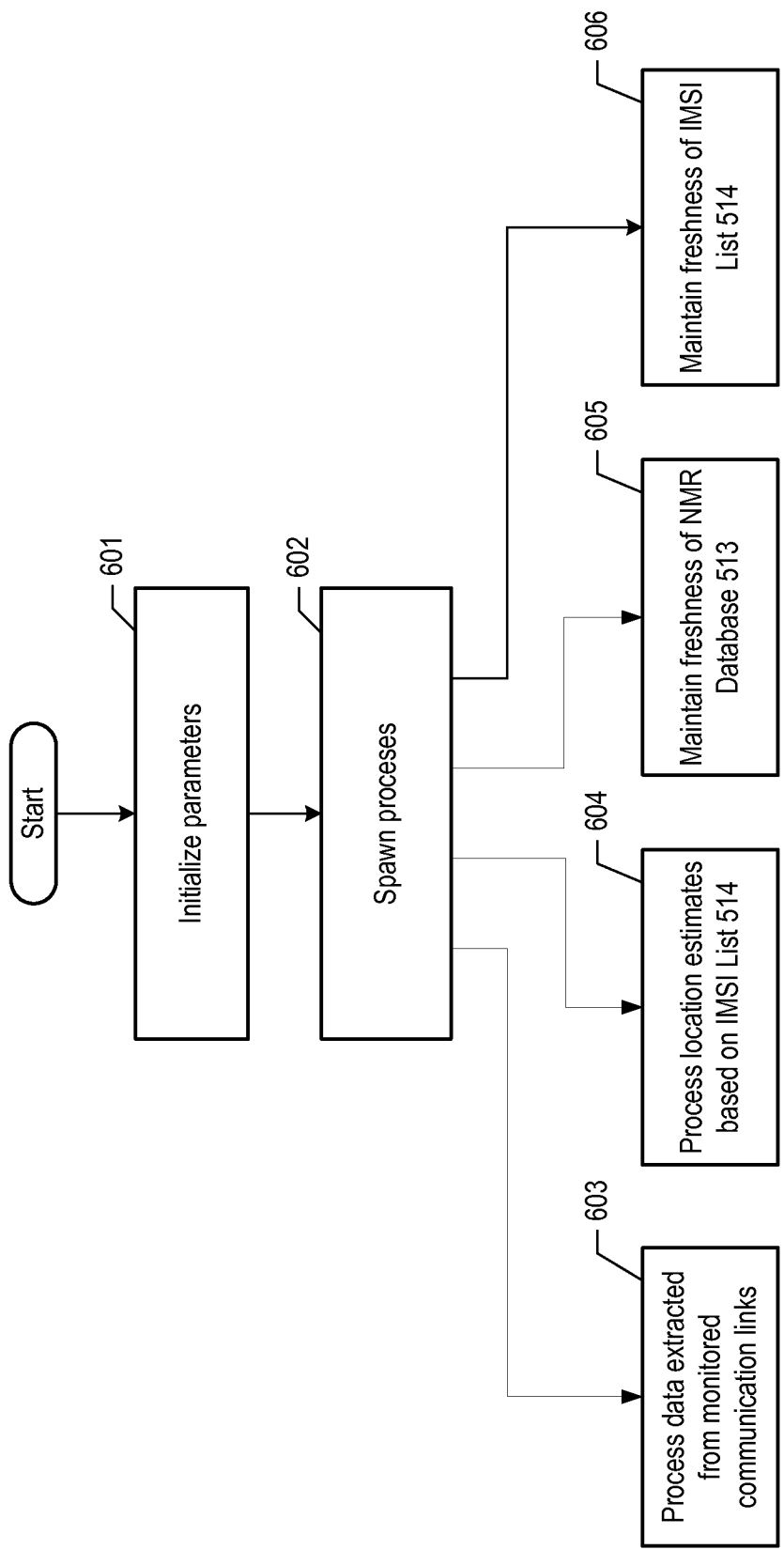
FIG. 6 depicts a flowchart of the salient processes performed in accordance with the illustrative embodiment of the present invention.

FIG. 6 depicts a flowchart of the salient processes performed in accordance with the illustrative embodiment of the present invention.

The processes performed by wireless telecommunications system 400 of the illustrative embodiment are depicted in the drawings (i.e., FIG. 6 and subsequent figures) as being performed in a particular order. It will, however, be clear to those skilled in the art, after reading this disclosure, that these operations can be performed in a different order than depicted or can be performed in a non-sequential order (e.g., in parallel, etc.). In some embodiments of the present invention, some or all of the depicted processes might be combined or performed by different devices. In some embodiments of the present invention, some of the depicted processes might be omitted.

In accordance with process 601, location server 413 initializes various parameters, including IMSI List 514. Server 413 initially populates IMSI List 514 with subscriber information obtained from HLR 412. It will be appreciated that the subscriber information from the home location register will provide information about the "home" region of each mobile station. Assuming that geographic region of interest (i.e., region 420) to the operator of system 400 is the home region, at least some of the mobile stations that are currently in region 420 might not be in their "home" region—that is, they might be roaming, away from their home region. Conversely, other mobile stations whose home region is, in fact, region 420 might be currently roaming elsewhere—that is, might not be currently in region 420. As a consequence, the IMSIs obtained from the HLR are a first approximation of which mobile stations are present in geographic region of interest 420.

In some embodiments of the present invention, location server 413 can obtain one or more additional IMSIs from HLR 412 after the initial acquisition of IMSIs. In those embodiments, server 413 can obtain the additional IMSIs, for example, periodically or sporadically.

IMSI List 514 is generated such that the IMSIs in the list are sorted in ascending, numerical order. As those who are skilled will appreciate, after reading this specification, a different type of sorting order can be applied in alternative embodiments of the present invention such as, for example and without limitation, descending numerical order, alphabetical order based on the underlying subscribers' names or other information, and so on.

Location server 413 also initializes various parameters, including a location-processing pointer, an NMR maintenance pointer, and an IMSI maintenance pointer, which are used in the spawned processes as described below.

In accordance with process 602, location server 413 spawns processes 603, 604, 605, and 606, such that these processes run at least partially concurrently and at least partially asynchronously with respect to one another. Processes 603 through 606 are described in detail below.

In accordance with spawned process 603, location server 413 processes data extracted by and received from probes 404-1 through 404-3, which are monitoring the nonempty set of communication links (e.g., Abis links, etc.) to which they are coupled, in well-known fashion. Process 603 is described below and in FIG. 7.

In accordance with spawned process 604, location server 413 processes location estimates of mobile stations that appear on IMSI List 514. The details of process 603 are described below and in FIGS. 8 through 10.

In accordance with process 605, location server 413 maintains NMR Database 513. The details of process 605 are described below and in FIG. 11.

In accordance with process 606, location server 413 maintains IMSI List 514. The details of process 606 are described below and in FIG. 12.

In accordance with the illustrative embodiment, the monitoring of the communication links performed in process 603, the processing of location estimations performed in process 604, the maintenance of NMR Database 513 performed in process 605, and the maintenance of IMSI List 514 performed in process 606 are performed at least partially concurrently and at least partially asynchronously with respect to one another. In some alternative embodiments of the present invention, however, some or all of these processes might be performed according to a different temporal relationship.

Processing Data Extracted from Monitored Communication Links—

Figure 7:
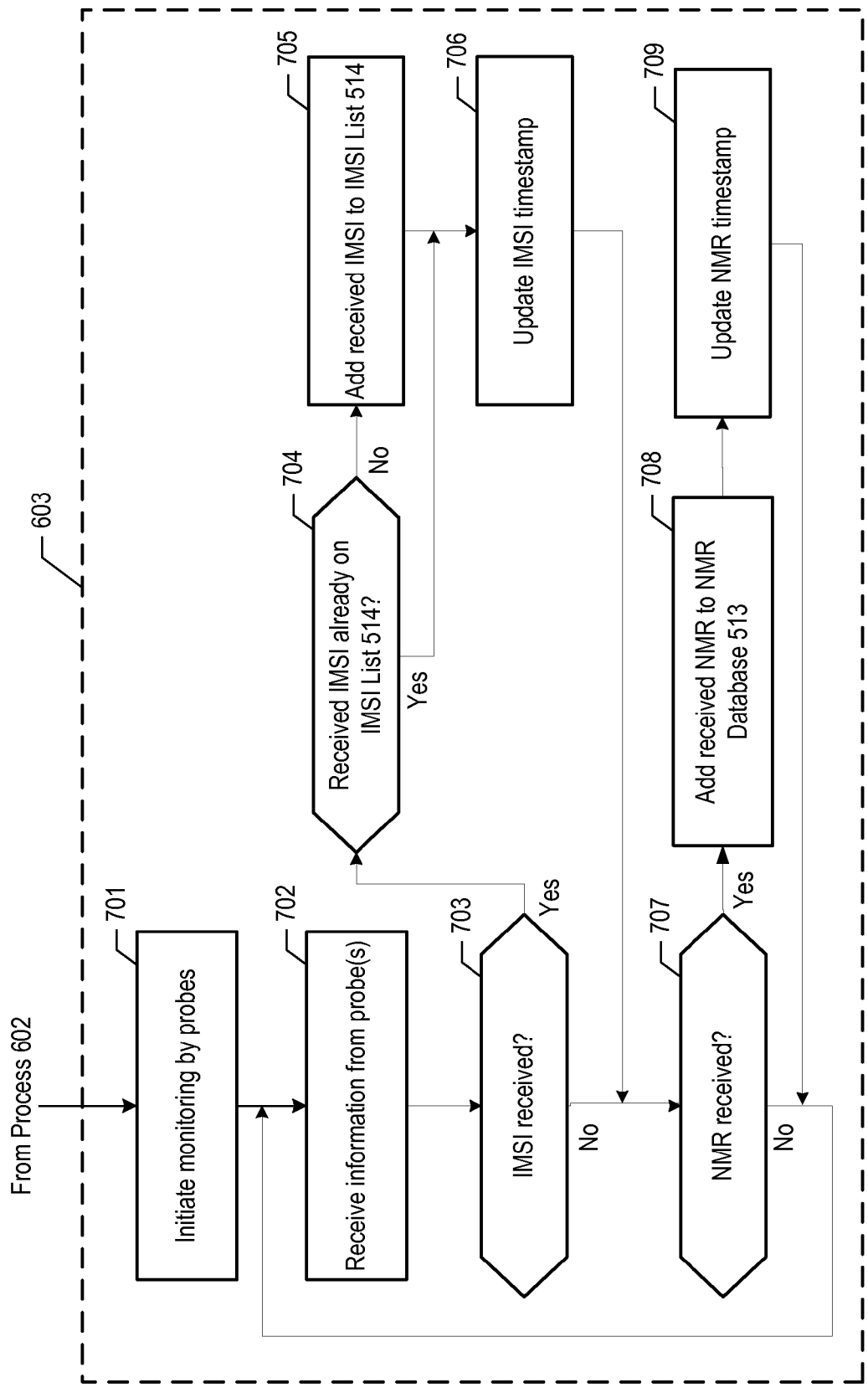
FIG. 7 depicts a flowchart of the salient processes performed in accordance with process 603.

FIG. 7 depicts a flowchart of the salient processes performed in accordance with process 603—processing data extracted from the monitored communication links by probes 404-1 through 404-3.

In accordance with process 701, location server 413 initiates the monitoring of the communication links by probes 404-1 through 404-3. Probes 404-1 through 404-3 monitor for triggers that include, while not being limited to, i) messages that comprise IMSIs and ii) NMR messages. When a trigger is detected by any of probes 404-1 through 404-3, the corresponding information (e.g., IMSI, NMR, etc.) is provided to location server 413. In some alternative embodiments of the present invention, a different mechanism or device than server 413 initiates the monitoring by the probes.

In accordance with process 702, location server 413 receives trigger-related data from the sending probe.

If the data comprises an IMSI, as determined by process 703, the IMSI is compared to the IMSIs in List 514 in accordance with process 704 to determine whether the IMSI is current in the IMSI list. If the received IMSI is not in IMSI List 514, then the IMSI is added to the list in process 705. In accordance with the illustrative embodiment, the received IMSI is added to a particular place in the list such that the sorting order (e.g., ascending numerical order, etc.) is preserved.

In cases where the IMSI is received from a mobile station, as opposed from the service provider's equipment (e.g., BTS, etc.), the timestamp of the IMSI stored in IMSI List 514 is updated in accordance with process 706. The timestamp is updated regardless of whether the IMSI was already stored in the list or not. The timestamp is updated in order to reflect the most recent time that a message has been received from the mobile station and is used to determine how "fresh" the IMSI is, as described later.

If the data received from the sending probe comprises an NMR, as determined by process 707, the NMR is added to NMR Database 513 in accordance with process 708. The timestamp of the NMR stored in the database is updated in accordance with process 709. The timestamp is updated in order to reflect the most recent time that an NMR has been received and is used to determine how "fresh" the NMR is, as described later.

Control of process execution then proceeds back to process 702, and the aforementioned processes are repeated.

Processing Location Estimates—

Figure 8:
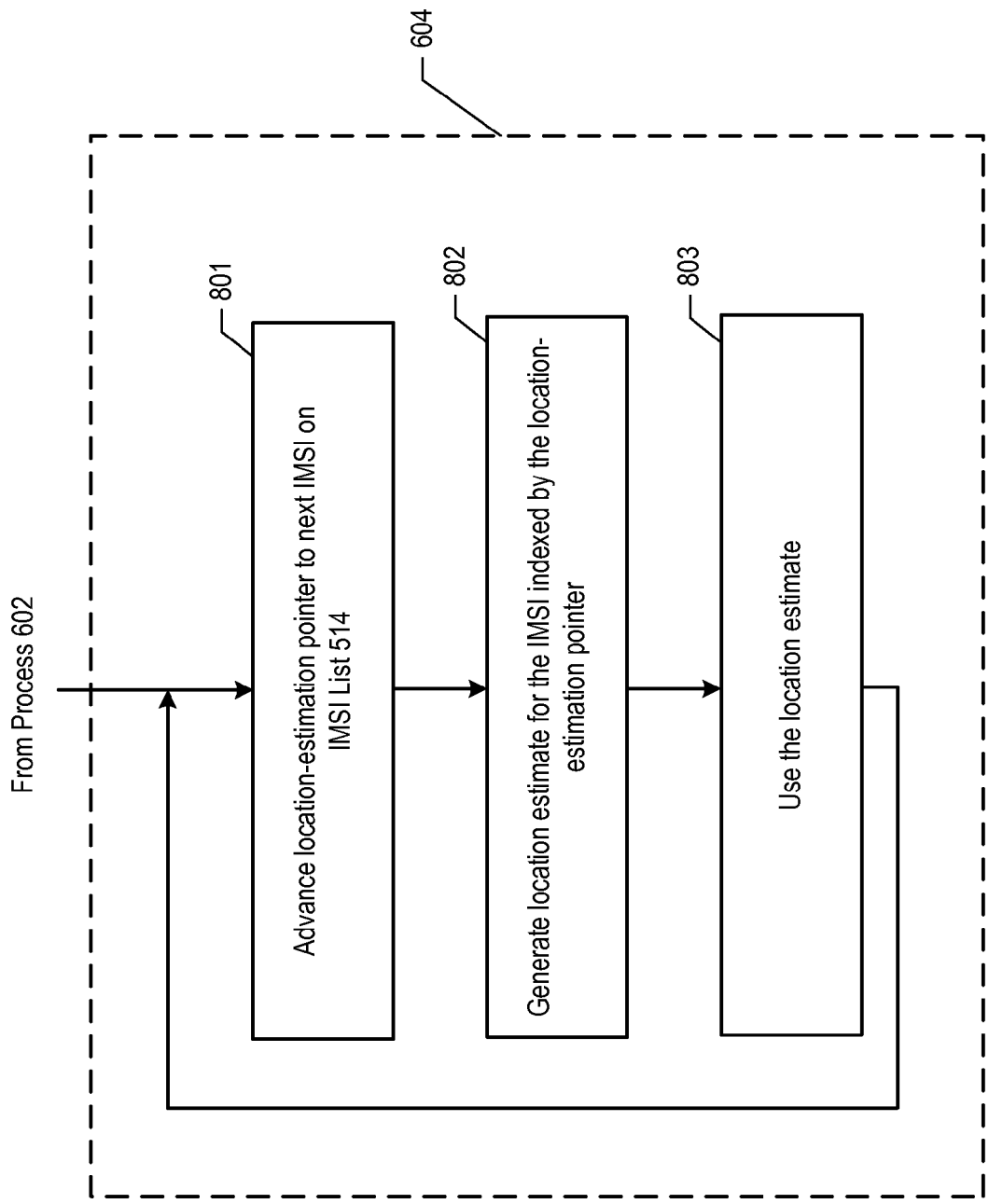
FIG. 8 depicts a flowchart of the salient processes performed in accordance with process 604.

FIG. 8 depicts a flowchart of the salient processes performed in accordance with process 604—processing location estimates based on IMSI List 514, which comprises the generation of location estimates and the use of the estimates.

Figure 9:
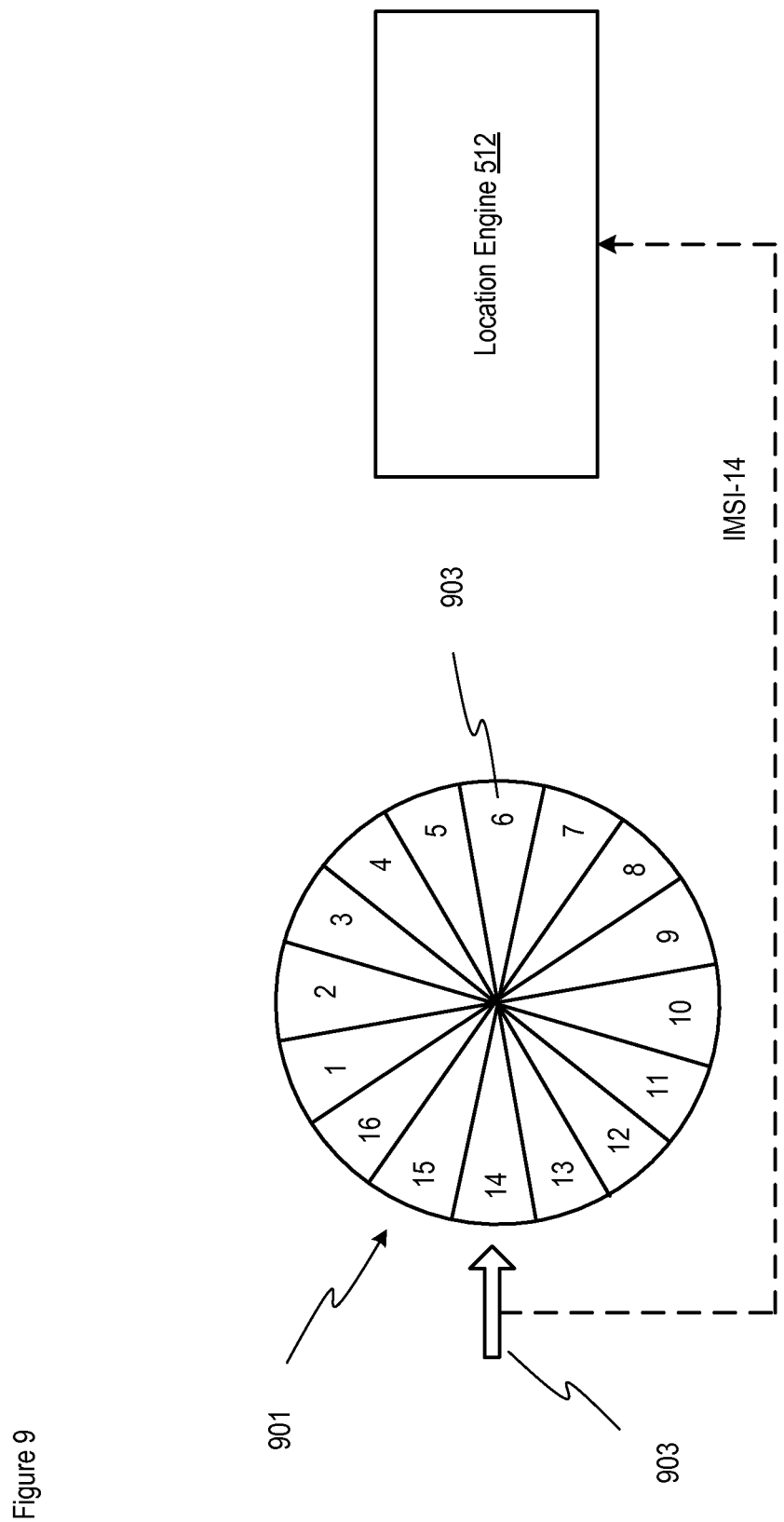
FIG. 9 depicts the basic operations that are associated with continually generating location estimates of the mobile stations identified by IMSI List 514.

The basic operations that are associated with continually generating location estimates of the mobile stations identified by IMSI List 514 are depicted in FIG. 9. The circular form of IMSI List 901 is meant to indicate that this list is maintained in memory 501 as a circular-queue data structure, in accordance with the illustrative embodiment of the present invention. FIG. 9 depicts IMSI List 514 as having 16 "memory" locations capable of storing 16 IMSIs, such as IMSI 902. In practice, however, IMSI List 514 will require hundreds of thousands or millions of memory locations for storing a like number of IMSIs.

Location-processing pointer 903 sequentially indexes each IMSI. As each IMSI is indexed, a signal is sent to location engine 512 requesting that the location engine generate a location estimate for the mobile station associated with the IMSI. As a result, the location-processing pointer "triggers" the location estimate for any given mobile station. For example, FIG. 9 depicts pointer 903 indexing IMSI-14; in this case, a signal is consequently sent directing location engine 512 to generate a location estimate for IMSI-14.

After pointer 903 indexes IMSI-16, it continues with IMSI-1. In other words, there is no boundary to a circular queue, as the pointer continues to repeatedly sequentially index the IMSIs in IMSI List 901.

Although a circular-queue data structure is represented in FIG. 9, it will be clear to those skilled in the art, after reading this specification, how to make and use alternative embodiments of the present invention that feature a different type of data structure for storing and handling IMSI List 514.

Referring back to FIG. 8 and in accordance with process 801, location server 413 advances the location-processing pointer to the next IMSI on IMSI List 514.

Figure 10:
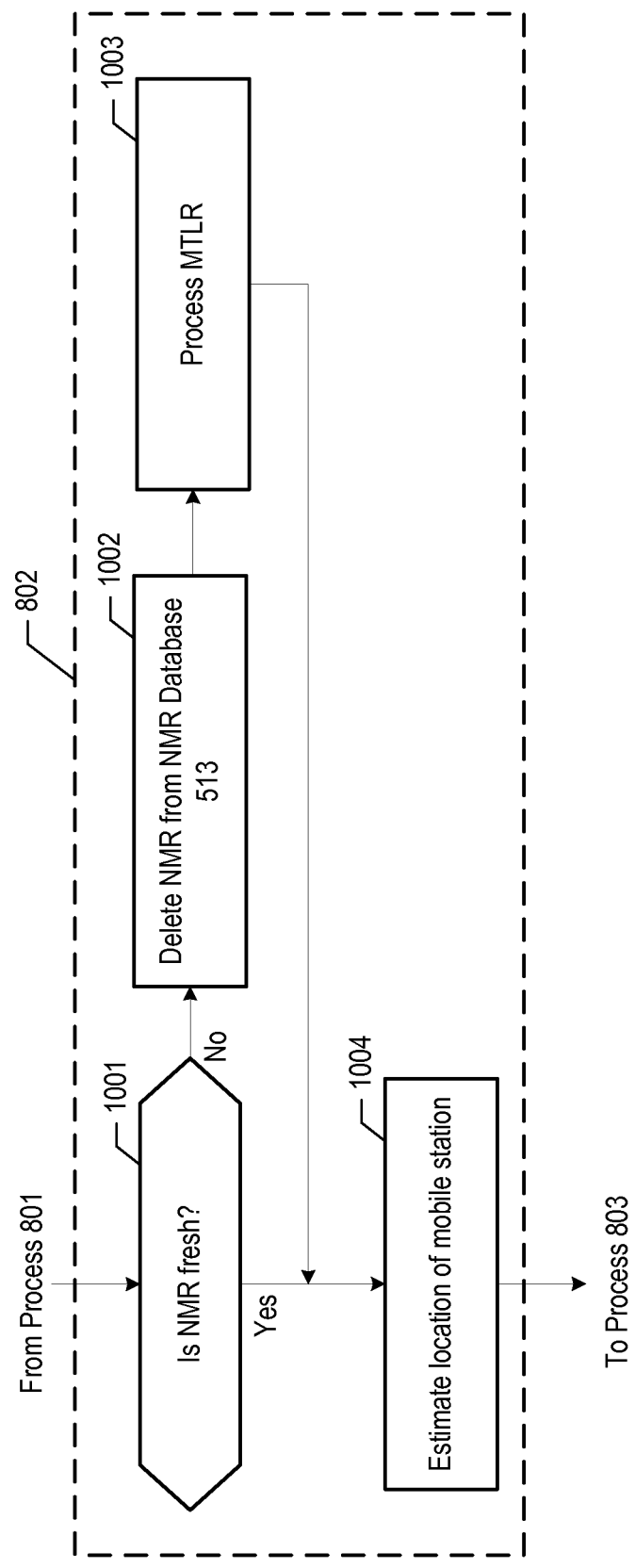
FIG. 10 depicts using one or more NMRs that correspond to the currently-indexed IMSI, in order to generate the location estimate.

In accordance with process 802, location server 413 generates a location estimate of the mobile station that corresponds to the IMSI currently indexed by the location-processing pointer. FIG. 10 depicts using one or more NMRs that correspond to the currently indexed IMSI, in order to generate the location estimate. In accordance with process 1001, location server 413 determines whether a fresh NMR is available for the current IMSI in NMR Database 513. The determination of whether an NMR is fresh is described below and in FIG. 11. If a fresh NMR is available, then control proceeds to process 1004.

If an NMR for the current IMSI exists in the database, but is not fresh (i.e., is "stale"), then the NMR is deleted from NMR Database 513 in accordance with process 1002.

In accordance with process 1003, location server 413 initiates and processes a Mobile-Terminated Location Request (MTLR), in which the server transmits the message to mobile station 401, invoking the mobile to take measurements and transmit back an NMR representative of those measurements.

Server 413 receives the NMR sent in response to the MTLR quickly (i.e., typically less than a second). A period of time is allowed for response (e.g., five seconds, etc.), as deemed appropriate based on the particular telecommunications network. If an NMR is received, location server 413 adds the NMR to Database 513. In some embodiments of the present invention, if an NMR is not received then location server 413 notes this failure in the corresponding mobile station entry in IMSI List 514.

In accordance with process 1004, and using the fresh NMR, location server 413 estimates the location of the mobile station that corresponds to the currently indexed IMSI. There are a variety of techniques for location estimation. For example, U.S. Pat. No. 7,257,414 describes techniques for location estimation, including the use of one or more NMRs in the estimating process, and is incorporated herein by reference. As those who are skilled in the art will appreciate, after reading this specification, any of a number of different location determination techniques can be used to generate a location estimate of the mobile station.

Referring back to FIG. 8, in accordance with process 803, the estimate of the location of wireless terminal 401 is used in a location-based application, such as and without limitation, E 9-1-1 service. In support of this, location server 413 transmits to the location-based application, such as an application implemented by location client 414.

Control of process execution then proceeds back to process 801, and the aforementioned processes are repeated.

Maintaining NMR Database 513—

Figure 11:
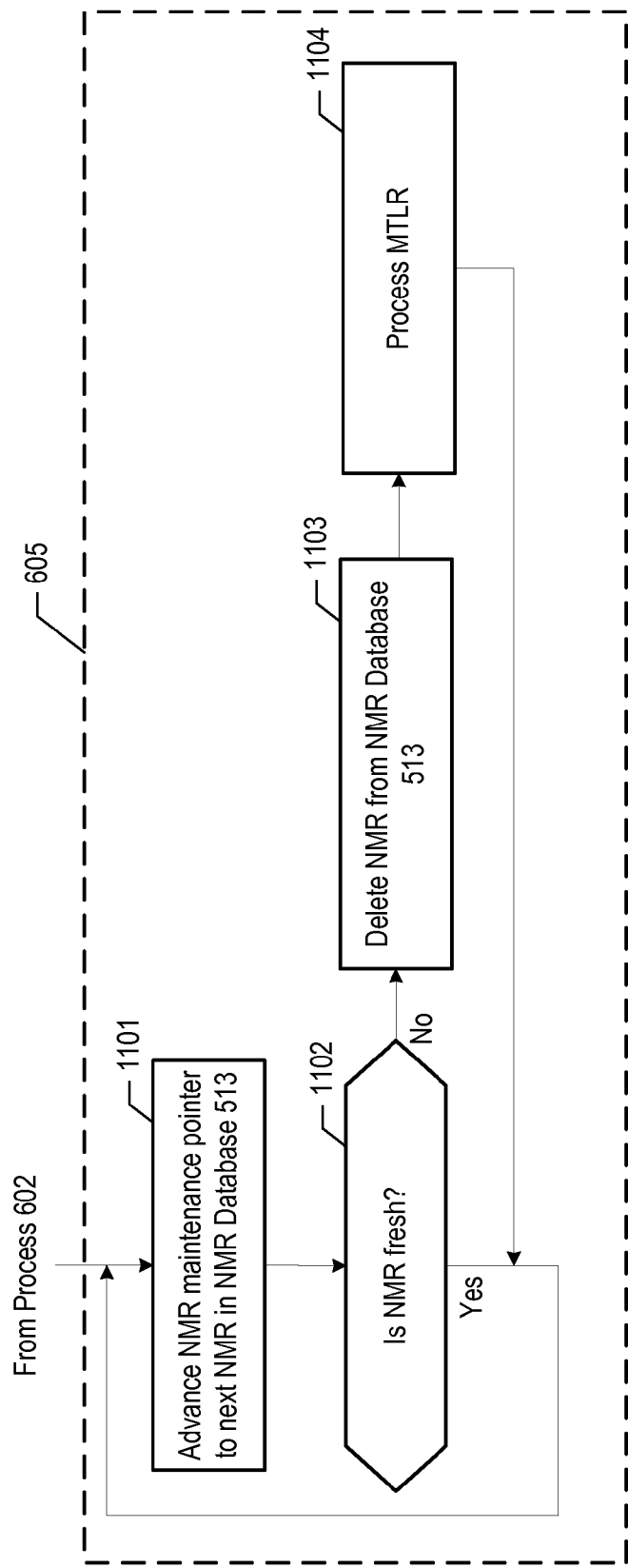
FIG. 11 depicts a flowchart of the salient processes performed in accordance with process 605.

FIG. 11 depicts a flowchart of the salient processes performed in accordance with process 605—maintaining the freshness of the NMRs in NMR Database 513.

In accordance with process 1101, location server 413 advances the NMR maintenance pointer to the next NMR stored in the database.

In accordance with process 1102, location server 413 determines whether the currently indexed NMR in the database is "fresh." In an NMR context, freshness if a function of the age of the data. For example, one might consider NMR data that is older than 30 minutes (or 20 minutes, or 15 minutes) to be not fresh (i.e., "stale"), considering the mobility of any given subscriber. One skilled in the art will know how to establish a limit for an acceptable age of NMR data. As already described, each NMR is stored with a timestamp; in order to determine whether the data is fresh or not, location server 413 compares the timestamp with clock 504 in well-known fashion.

In accordance with process 1103, if the NMR is not fresh in that its timestamp differs from the current time by at least a predetermined amount, then the NMR is deleted from NMR Database 513.

In accordance with process 1104, location server 413 initiates and processes a Mobile-Terminated Location Request (MTLR), in which the server transmits the message to mobile station 401, invoking the mobile to take measurements and transmit back an NMR representative of those measurements.

Server 413 receives the NMR sent in response to the MTLR quickly (i.e., typically less than a second). A period of time is allowed for response (e.g., five seconds, etc.), as deemed appropriate based on the particular telecommunications network. If an NMR is received, location server 413 adds the NMR to Database 513. In some embodiments of the present invention, if an NMR is not received then location server 413 notes this failure in the corresponding mobile station entry in IMSI List 514.

In some alternative embodiments of the present invention, location server 413 does not initiate (i.e., refrains from initiating) an MTLR after deletion of an NMR. Instead, the server initiates an MTLR only when a location estimate is to be generated for the mobile station whose NMR has been deleted from NMR Database 513.

Control of process execution then proceeds back to process 1101, and the aforementioned processes are repeated.

Maintaining IMSI List 514—

Figure 12:
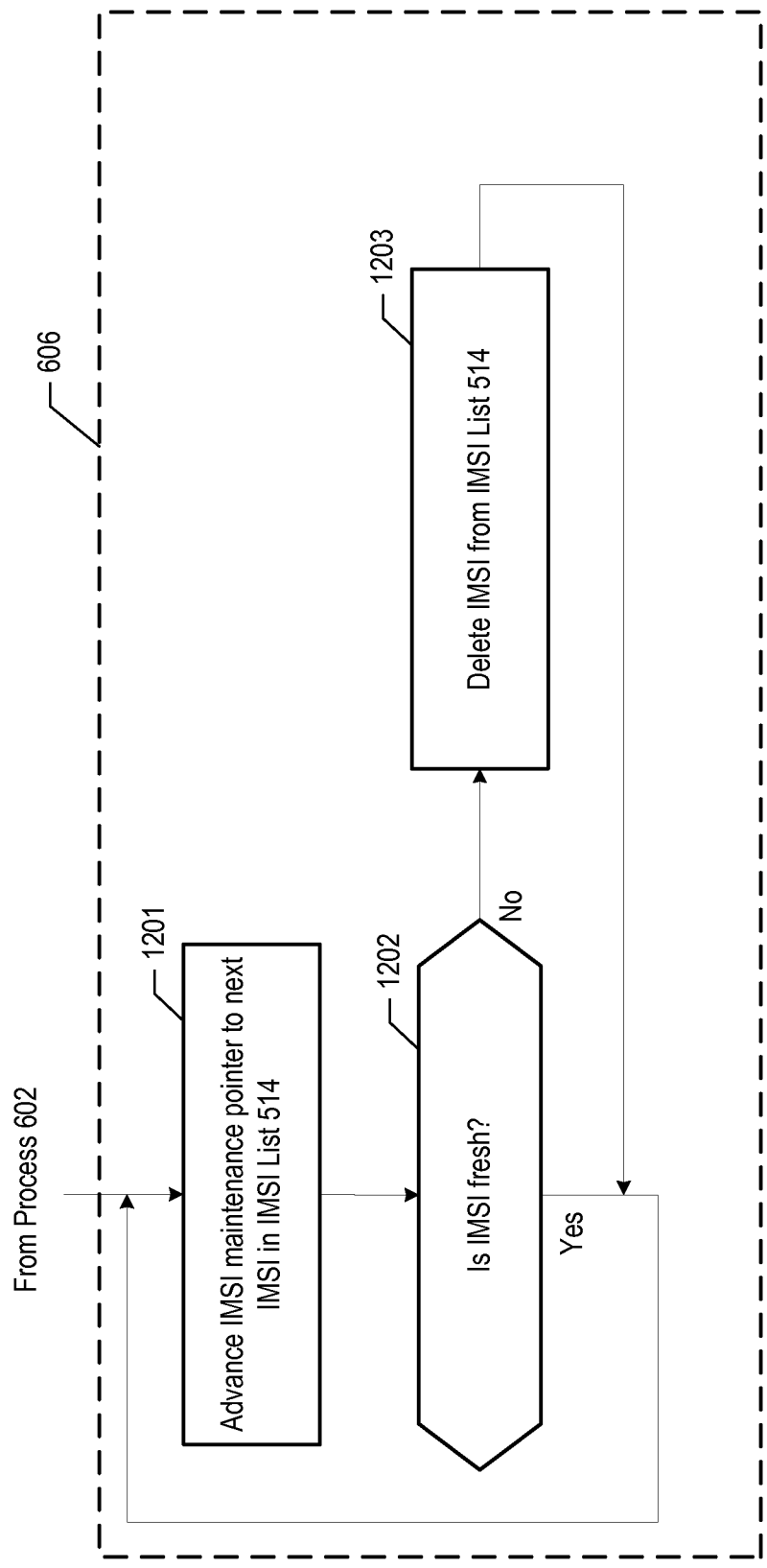
FIG. 12 depicts a flowchart of the salient processes performed in accordance with process 606.

FIG. 12 depicts a flowchart of the salient processes performed in accordance with process 606—maintaining the freshness of IMSI List 514.

In accordance with process 1201, location server 413 advances the IMSI maintenance pointer to the next IMSI on IMSI List 514.

In accordance with process 1202, location server 413 determines whether the currently indexed IMSI in the list is "fresh." In an IMSI context, freshness if a function of whether the corresponding mobile station is still within geographic region 420 and can be inferred from the activity of the mobile station. As already described, each IMSI is stored with a timestamp that marks the latest detection of an IMSI arriving from the corresponding mobile station; in order to determine whether the data is fresh or not, location server 413 compares the timestamp with clock 504 in well-known fashion. For example, one might consider an IMSI of a mobile station from which no messages have been received for more than 24 hours (or 12 hours, or 6 hours) to be not fresh (i.e., "stale"). Whether such a message has been received is based on whether an IMSI has been detected by any of probes 404-1 through 404-3. One skilled in the art will know how to establish a time limit for whether an IMSI has been detected.

In accordance with process 1203, if the IMSI is not fresh in that its timestamp differs from the current time by at least a predetermined amount, then the IMSI is deleted from IMSI List 514.

In some alternative embodiments of the present invention, as previously described in processes 1003 and 1104, the failure to obtain an NMR in response to a mobile terminal location request (MTLR) is noted by incrementing a failure counter for that mobile station in IMSI List 514. If the reported number of failures exceeds a threshold value, the IMSI is deleted from the IMSI list and the failure counter is reset to zero. The significance and determination of the threshold value is explained below.

It might be assumed that if a mobile station fails to report after 24 hours, then it is considered to be roaming; that is, to be out of the geographic region of interest. Based on an estimated amount of time to cycle through the IMSI list, the threshold number of response failures can be determined. Specifically, an MTLR is made in process 1003 or process 1104 in response to a mobile-terminated location request. If it takes four hours to cycle through all IMSIs in the IMSI list, such a location request will occur approximately once every four hours for a given mobile station. As a consequence, if no response is received after six four-hour periods, which corresponds to seven MTLRs and seven failure "counts" in the IMSI list, the mobile station can be assumed to be out of the region and the IMSI is dropped. In view of the previous discussion, those skilled in the art can readily establish a different threshold for embodiments in which a different cycle time prevails and/or a different wait period for dropping the IMSI is used.

After process 1203, control of process execution then proceeds back to process 1201, and some or all of the aforementioned processes are repeated.

The asynchronous nature of the updating processes of IMSI List 514, in accordance with the illustrative embodiment of the present invention, is apparent from the foregoing disclosure. If an IMSI is added in accordance with process 705, it is a consequence of the operation of the communication link (e.g., Abis link, etc.) probes. Adding an IMSI is a function of both i) the rate at which IMSIs are detected on and extracted from the monitored communication links, and ii) the random nature of whether the IMSI is already present in IMSI List 514 or not. If an IMSI is deleted, in accordance with process 1203, it occurs as a byproduct of the independent process of advancing through IMSI List 514, IMSI-by-IMSI. The timing of a deletion, to the extent one occurs, is primarily a function of both i) the rate at which IMSIs arriving from mobile stations are detected on and extracted from the monitored communication links, and ii) the rate at which the IMSI maintenance pointer cycles through the IMSI list (e.g., once every 3-4 hours, etc.). It is manifest that these processes operate asynchronously with respect to one another.

It should also be clear from the foregoing disclosure that when a location request is issued, it occurs independently of IMSI List updates. That is, a location request is issued as a consequence of location-estimation pointer position and/or NMR maintenance pointer position. These pointers' positions are independent of the IMSI List updating processes, whether an IMSI is added because a previously unlisted IMSI appears on a communication link and is extracted by one of probes 404-1 through 404-3, or whether an IMSI is deleted as a consequence of the IMSI no longer being considered fresh.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method for locating one or more mobile stations in a geographic region of interest served by a wireless telecommunications network, the method comprising:

storing, by a data-processing system, a list of International Mobile Subscriber Identities (IMSI) that are present in the list according to a predetermined ordering, wherein the IMSIs in the list identify mobile stations for which location estimates are to be generated;

monitoring, by the data-processing system, a nonempty set of predetermined communication links in the wireless telecommunications network, wherein the set of communication links comprise at least an Abis link, and wherein the communication links are monitored for i) messages that comprise IMSIs and ii) Network Measurement Report (NMR) messages;

generating, by the data-processing system, location estimates for the mobile stations that are identified by the IMSIs in the list, wherein the generating of each location estimate is triggered based on sequentially indexing each IMSI in the list, and wherein the location estimates are based the NMR messages;

deleting, by the data-processing system, a first IMSI from the list when it is determined that the mobile station identified by the first IMSI is no longer available in the geographic region of interest;

detecting, by the data-processing system, a first NMR message on a communication link of the monitored set of communication links;

storing in a memory, by the data-processing system, the detected first NMR message;

deleting, from the memory, a second NMR message when the second NMR message has been stored in the memory for at least a predetermined time interval; and transmitting a mobile terminal location request (MTLR) to a first mobile station, wherein the detecting of the first NMR message is based on the transmitting of the MTLR, and wherein the transmitting of the MTLR is based on whether any NMR message that corresponds to the first mobile station is stored in the memory.

* * * * *